G. AMBORN.
CHAIN PIPE VISE.
APPLICATION FILED AUG. 12, 1913.
1,103,243.
Patented July 14, 1914.
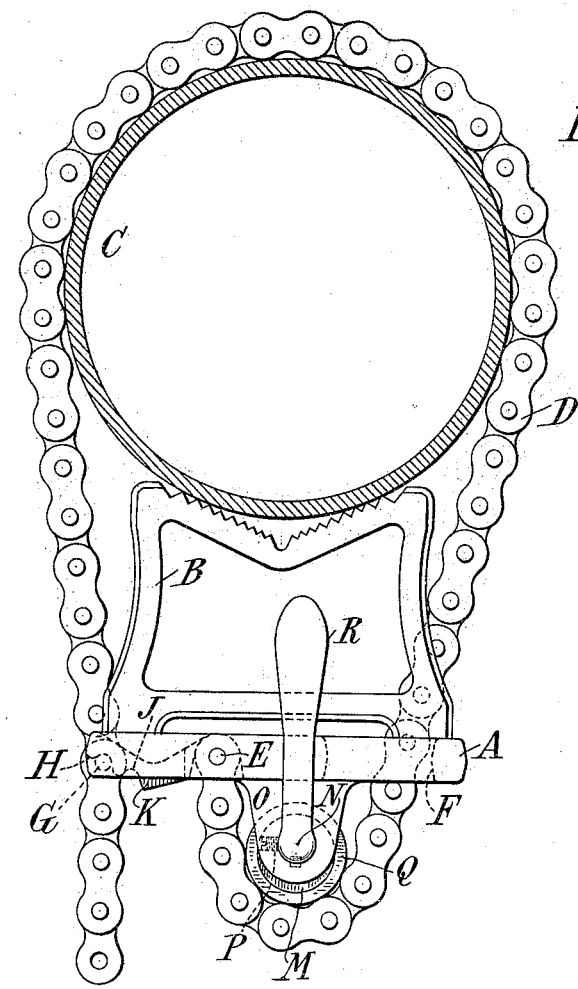
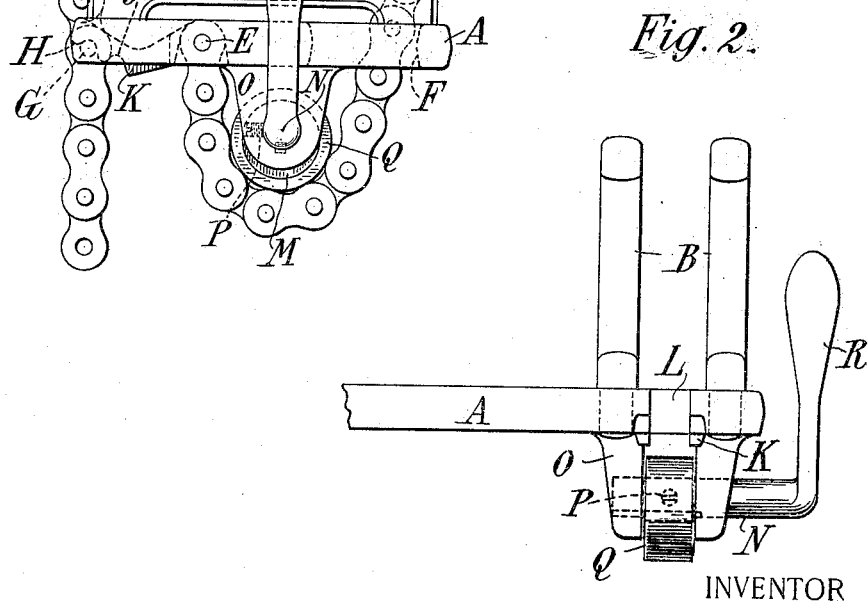
WITNESSES:
INVENTOR:
George Amborn,
By Attorneys,

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

CHAIN PIPE-VISE.

1,103,243.  Specification of Letters Patent.  Patented July 14, 1914.

Application filed August 12, 1913. Serial No. 784,400.

*To all whom it may concern:*

Be it known that I, GEORGE AMBORN, a citizen of the United States, residing at Chapinville, in the county of Litchfield and State of Connecticut, have invented certain new and useful Improvements in Chain Pipe-Vises, of which the following is a specification.

This invention aims to provide certain improvements in chain pipe vises whereby the chain may be quickly and easily applied and tightened upon the pipe, and to provide a construction which shall be simple and durable.

The accompanying drawings illustrate an embodiment of the invention.

Figure 1 is an end elevation of a vise with the chain applied thereon; Fig. 2 is a side elevation of the jaws of the vise with the chain and pipe removed.

Referring to the embodiment of the invention illustrated, the base A is mounted on a table or bench in any usual or suitable way, and carries at one end a pair of jaws B the upper edges of which are toothed and recessed to receive the pipe C. The chain D has one end fixed to the base by means of a pin E, and passes thence downward about a tightening device and thence upward through an opening F in the base. The other end of the chain is thrown over the pipe C and caught by one of its pintles G in one or another of the two notches H and J formed in projections K upon the inner faces of an open-ended slot L (Fig. 2) at the side of the base. By this means the chain is fitted as closely to the pipe as the spaces between the pintles and the location of the notches H and J will permit.

Additional means are provided for tightening the chain around the pipe after its free end has been locked in the manner described. This tightening means includes a cam member and an antifriction member between the cam member and the chain. In the example illustrated the cam member is an eccentric M keyed on a spindle N which is journaled in ears O projecting downward from the under side of the base A, the eccentric being fastened against lateral movement by means of a set-screw P so as to prevent escape of the spindle from the bearings. The eccentric is surrounded by a ring Q rotatable on the eccentric and also held between the bearing lugs or ears O. The spindle N extends beyond the end of the base A and is provided on its outer end with a handle R adapted to swing below the pipe. The loose end of the chain is fastened while the handle R hangs down, after which the handle is swung upward and the eccentric M takes up any slack in the chain and forcibly tightens the same. The increase in the effective radius of the eccentric is so slow that it retains any position to which it is set. At the same time the throw of the eccentric is sufficient to take up the greatest possible slack in the chain by a single quick movement of the handle. The antifriction ring bears directly against the chain and may be held stationary by its friction on the chain, while permitting movement of the eccentric against only a slight and uniform frictional resistance; so that the chain may be made tighter than if the handle had to be worked against a greater frictional resistance or a less uniform resistance.

I claim as my invention:—

1. A chain pipe vise having a chain adapted to be fastened around the pipe, and means engaging the bight of the chain for tightening the latter on the pipe, said means including a cam member and an antifriction member between the cam member and the chain.

2. A chain pipe vise having a chain adapted to be fastened around the pipe, and means engaging the bight of the chain for tightening the latter on the pipe, said means including an eccentric and a ring loose on said eccentric and located between the chain and the eccentric.

3. A chain pipe vise having a chain adapted to be fastened around the pipe and means engaging the bight of the chain for tightening the latter on the pipe, said means including an antifriction member.

In witness whereof, I have hereunto signed my name in the presence of two subscribing witnesses.

GEORGE AMBORN.

Witnesses:
CHARLES B. HARRIS,
WILLIAM HILDEBRAND.

Copies of this patent may be obtained for five cents each, by addressing the "Commissioner of Patents, Washington, D. C."